United States Patent
Shindo et al.

(10) Patent No.: US 9,568,949 B2
(45) Date of Patent: Feb. 14, 2017

(54) ELECTRONIC APPARATUS

(71) Applicant: Panasonic Intellectual Property Management Co., Ltd., Osaka (JP)

(72) Inventors: Kenichi Shindo, Osaka (JP); Jun Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 14/763,978

(22) PCT Filed: Feb. 7, 2014

(86) PCT No.: PCT/JP2014/000659
§ 371 (c)(1),
(2) Date: Jul. 28, 2015

(87) PCT Pub. No.: WO2014/125803
PCT Pub. Date: Aug. 21, 2014

(65) Prior Publication Data
US 2015/0362953 A1 Dec. 17, 2015

(30) Foreign Application Priority Data

Feb. 13, 2013 (JP) .................. 2013-025377

(51) Int. Cl.
*H05K 5/00* (2006.01)
*G06F 1/16* (2006.01)
(Continued)

(52) U.S. Cl.
CPC .......... *G06F 1/1632* (2013.01); *H02J 7/0044* (2013.01); *H01R 12/714* (2013.01); *H01R 13/24* (2013.01)

(58) Field of Classification Search
CPC ..... G06F 1/1632; G06F 1/1635; H02J 7/0044; H04B 1/3883; H04B 1/3877; H05K 5/0247; H05K 5/03
See application file for complete search history.

(56) References Cited

U.S. PATENT DOCUMENTS 8,550,343 B2 * 10/2013 Ko .................. G07F 7/0886
235/383
2012/0092822 A1 4/2012 Mooring et al.

FOREIGN PATENT DOCUMENTS

JP 06-202760 7/1994
JP 07-306737 11/1995
(Continued)

OTHER PUBLICATIONS

International Search Report issued Mar. 11, 2014 in International (PCT) Application No. PCT/JP2014/000659.

*Primary Examiner* — Robert J Hoffberg
*Assistant Examiner* — Hung Dang
(74) *Attorney, Agent, or Firm* — Wenderoth, Lind & Ponack, L.L.P.

(57) ABSTRACT

An electronic apparatus of the present invention has a bottom surface on which a first connection terminal is disposed, and a rear surface on which a second connection terminal is disposed. The first connection terminal and the second connection terminal are formed on a common substrate. An edge formed by the bottom surface and the rear surface is formed by the substrate. The electronic apparatus is to be connected to an expansion unit including a first connection-target terminal to which the first connection terminal is to be connected and a second connection-target terminal to which the second connection terminal is to be connected.

5 Claims, 20 Drawing Sheets

(51) Int. Cl.
*H02J 7/00* (2006.01)
*H01R 12/71* (2011.01)
*H01R 13/24* (2006.01)

(56) References Cited

FOREIGN PATENT DOCUMENTS

| | | |
|---|---|---|
| JP | 08-106341 | 4/1996 |
| JP | 2007-052486 | 3/2007 |
| JP | 2007-219394 | 8/2007 |
| JP | 2011-009844 | 1/2011 |

\* cited by examiner

F I G. 8 B
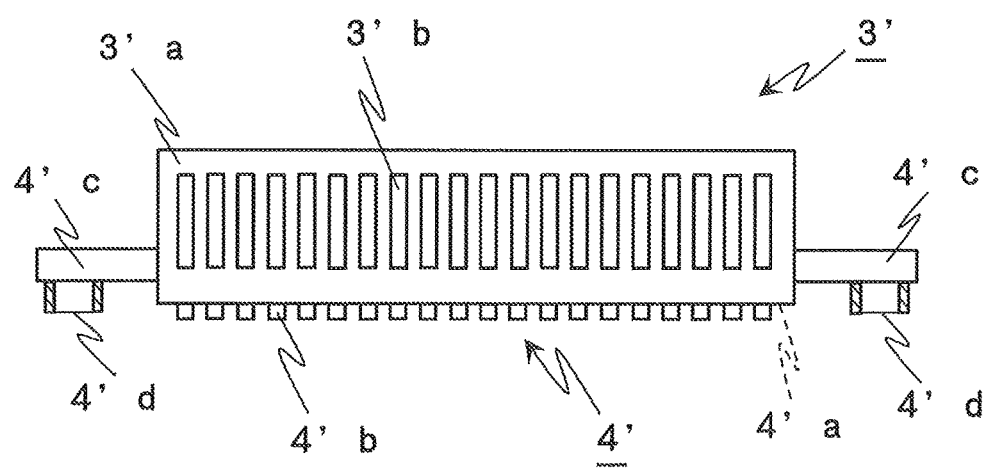

ELECTRONIC APPARATUS

TECHNICAL FIELD

The present disclosure relates to an electronic apparatus enabling addition of various information processing functions as extension when mounted on an expansion unit.

BACKGROUND ART

An electronic device system in which a computer is mounted on an expansion unit is disclosed in Patent Literature 1. Patent Literature 1 discloses an electronic device system that includes a computer having a housing with a modem built therein and a first extension connector disposed on a rear surface of the housing, and an expansion unit having a placement surface on which the computer is to be mounted on a removable manner and a second extension connector that is formed on the placement surface and to which the first extension connector is to be connected. In addition, the computer includes a first relay connector electrically connected to the modem, and the expansion unit includes a connector for communication to which a communication line is to be connected, and a second relay connector connected to the connector for communication. When the computer is mounted on the placement surface, the second relay connector is electrically connected, on the same lateral surface of the second extension connector, to the first relay connector that is separate from the second extension connector.

CITATION LIST

Patent Literature

[PTL 1] Japanese Laid-Open Patent Publication No. 07-306737

SUMMARY OF THE INVENTION

Problems to be Solved by the Invention

An object of the present disclosure is to provide an electronic apparatus that prevents the number of connection terminals from concentrating on the same surface, and is connectable to a single expansion unit.

Solution to the Problems

An electronic apparatus of the present disclosure has a bottom surface on which a first connection terminal is disposed and a rear surface on which a second connection terminal is disposed, wherein the first connection terminal and the second connection terminal are formed on a common substrate, an edge formed by the bottom surface and the rear surface is formed by the substrate, and an expansion unit, having a first connection-target terminal to which the first connection terminal is to be connected and a second connection-target terminal to which the second connection terminal is to be connected, is to be connected to the electronic apparatus.

Advantageous Effects of the Invention

The electronic apparatus according to the present disclosure can prevent concentrating of the area of terminal electrodes and can be miniaturized, while maintaining compatibility with an expansion unit.

BRIEF DESCRIPTION OF THE DRAWINGS

FIG. 8B is a front view of the main portions of the connection terminal.

DESCRIPTION OF EMBODIMENTS

Figure 1A:
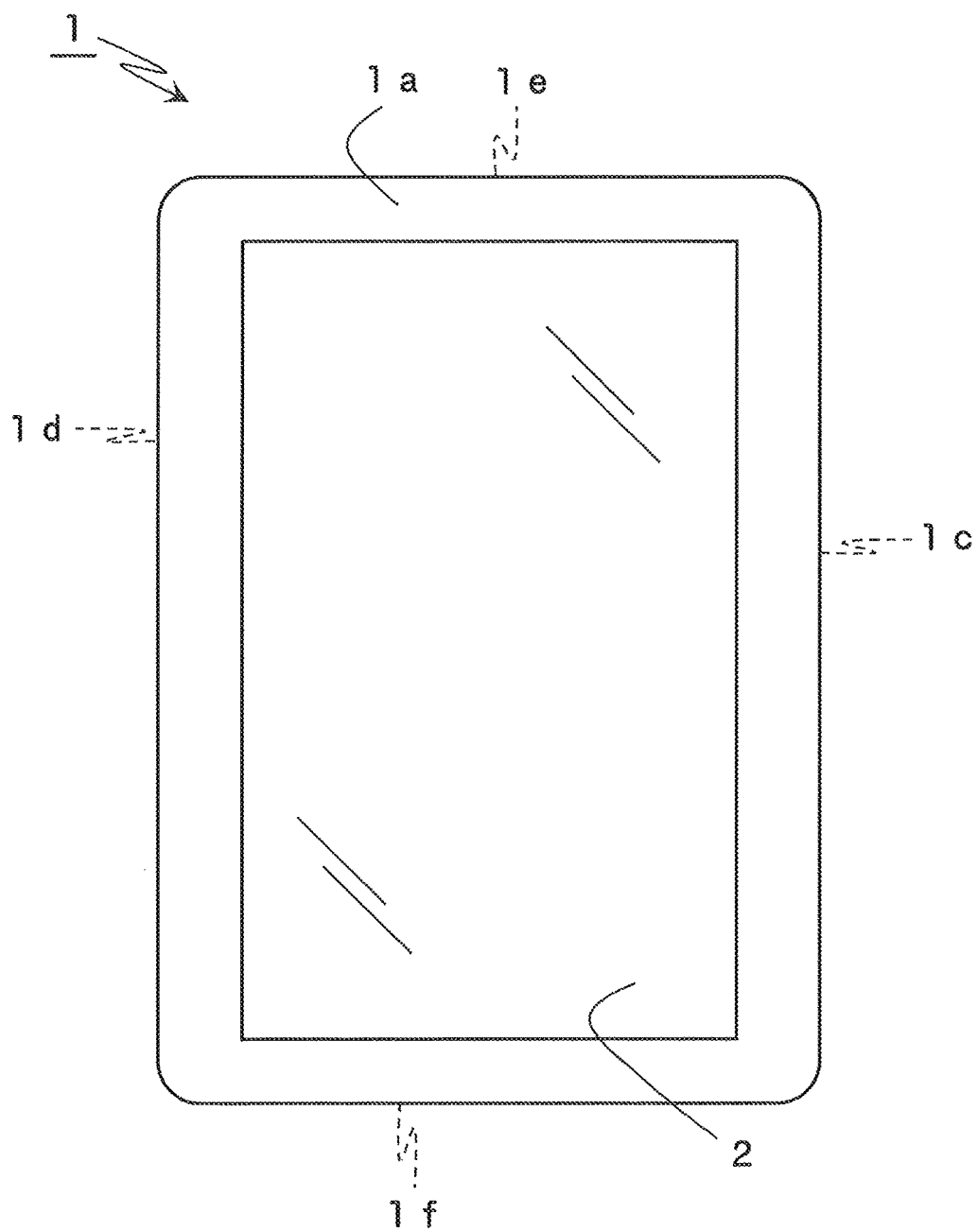
FIG. 1A is a front view of a tablet type computer (PC).

Instead of the above described electronic apparatus having a bottom surface on which a first connection terminal is disposed and a rear surface on which a second connection terminal is disposed, wherein the first connection terminal and the second connection terminal are formed on a common substrate, an edge formed by the bottom surface and the rear surface is formed by the substrate, and an expansion unit, having a first connection-target terminal to which the first connection terminal is to be connected and a second connection-target terminal to which the second connection terminal is to be connected, is to be connected to the electronic apparatus (an electronic apparatus having a first configuration); the electronic apparatus may have a configuration as described next.

For example, the electronic apparatus may have a second configuration in which, in the electronic apparatus having the first configuration, data-communication function is integrally managed through one of the first connection terminal and the second connection terminal, and charging function is integrally managed through a connection terminal other than the one of the first connection terminal and the second connection terminal. With this, among expansion units on which the electronic apparatus is mounted, an expansion unit that supports only one of charging function and extension function may have a reduced size.

In addition, for example, the electronic apparatus may have a third configuration in which, in the electronic apparatus having the first configuration, the first connection terminal and the second connection terminal connect to the respective connection-target terminals without shifting movement of terminals. With this, the first connection terminal and the second connection terminal can each easily form electrical connection with the corresponding connection-target terminals.

Furthermore, for example, the electronic apparatus may have a fourth configuration in which, in the electronic apparatus having the first configuration, the first connection-target terminal and the second connection-target terminal have spring characteristic, and, when connection is formed with the expansion unit, the electronic apparatus is subjected to a repulsive force generated by the first connection-target terminal from a side of the bottom surface toward a side of the rear surface, and a repulsive force generated by the second connection-target terminal from the side of the rear surface toward the side of the bottom surface. By having such a configuration, it becomes possible to ensure electrical connection between the first connection terminal and the first connection-target terminal and assist electrical connection between the second connection terminal and the second connection-target terminal by the repulsive force from the bottom surface side toward the rear surface side, and ensure electrical connection between the second connection terminal and the second connection-target terminal and assist electrical connection between the first connection terminal and the first connection-target terminal by the repulsive force from the rear surface side toward the bottom surface side.

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Hereinafter, a description will be given with, as an example of the electronic apparatus, a so-called tablet type personal computer (hereinafter, referred to as "PC") whose display panel has a touch function, and an expansion unit referred to as a docking station or a port replicator for extending functions of the PC. It should be noted that the PC is not limited to a tablet type. The present disclosure is widely applicable to electronic apparatuses. For example, the present disclosure may also be applied to computers referred to as a convertible type and a clam shell type, in which a display panel and an operation housing are rotatably engaged.

Embodiment 1

[Configuration of PC]

FIGS. 1A to 1D show the external configuration of a PC 1 of the present embodiment. The PC 1 is formed from a front surface 1a where a display panel 2 is included, a rear surface 1b that is an opposite surface of the front surface 1a, a lower surface 1c, an upper surface 1d, and a right surface 1e and a left surface 1f included in the interval between the front surface 1a and the rear surface 1b. The PC 1 has a thin box shape as described above. It should be noted that, the upper surface 1d, the lower surface 1c, the right surface 1e, and the left surface if are respectively defined as the upper side surface, the lower side surface, the right side surface, and the right-left side surface when a user views the display panel 2 in the state of FIG. 1A. In a manner similar to an ordinary portable computer, a circuit board having mounted thereon electronic components for driving the PC 1, and a rechargeable battery for driving the display panel 2 and electronic components, etc., are mounted on the interval between the front surface 1a and the rear surface 1b.

On the rear surface 1b and the lower surface 1c of the PC 1, a rear surface electrode 3 and a lower electrode 4 are disposed, respectively. The rear surface electrode 3 and the lower electrode 4 are to be electrically connected to a back surface electrode 7 and a bottom surface electrode 6 of an expansion unit 5 described later. In the present embodiment, the rear surface electrode 3 and the lower electrode 4 are disposed parallel to an intersection line formed between the rear surface 1b and the lower surface 1c. The rear surface electrode 3 and the lower electrode 4 are formed so as to share a common substrate, and are, for example, formed so as to share a common exterior material. At least an edge formed by the rear surface and the bottom surface of the PC 1 is formed by the substrate, and, in this case, is formed by the exterior material. It should be noted that this configuration is merely one example, and the rear surface electrode 3 and the lower electrode 4 may be disposed anywhere other than the center of the lower surface 1c. For example, the rear surface electrode 3 and the lower electrode 4 may be disposed in a biased manner toward either the right surface 1e or the left surface 1f side. In FIG. 1B, diagrammatic representation of electrodes 4b of the lower electrode 4 is omitted. The reason for that is because, if the electrodes 4b are diagrammatically represented in FIG. 1B, the electrodes 4b will overlap with the boundary line between the rear surface 1b and the lower surface 1c to make the representation confusing. To be precise, the electrodes 4b protrude on the bottom surface 1c side as shown in FIG. 1D. For the same reason, electrodes 3b of the rear surface electrode 3 are omitted also from FIG. 1C.

As shown in FIG. 1D, the rear surface electrode 3 of the present embodiment includes the electrodes 3b whose surrounding area is covered with an insulator 3a. In addition, as shown in FIG. 1C, the lower electrode 4 of the present embodiment includes the electrodes 4b whose surrounding area is covered with an insulator 4a. The insulator 3a and the insulator 4a are formed so as to share a common insulator substrate. In the present embodiment, the rear surface electrode 3 and the lower electrode 4 are formed so as to share a common insulator substrate. However, this is merely one example, and the rear surface electrode 3 and the lower electrode 4 may be formed separately. Still, forming the rear surface electrode 3 and the lower electrode 4 so as to share a common insulating substrate is advantageous in terms of cost, since all electrodes can be formed on the insulating substrate at once. In a direction orthogonal with respect to the longitudinal direction of the electrodes 4b of the lower electrode 4, one pair of retainers 4c are disposed. The retainers 4c can be formed by embedding the lower surface 1c (a configuration of the present embodiment shown in FIG. 1C) in, or screwing, using screws, the lower surface 1c to, for example, an acrylonitrile-butadiene-styrene copolymer resin forming the outline of the PC 1. Although the pair of the retainers 4c is formed around the lower electrode 4 in the present embodiment, a pair thereof may be included in a direction orthogonal with respect to a longitudinal direction of the electrodes 3*b* of the rear surface electrode 3, or pairs thereof may be included in respective surrounding area of the lower electrode 4 and the rear surface electrode 3.

[Configuration of Expansion Unit]

Figure 2A:
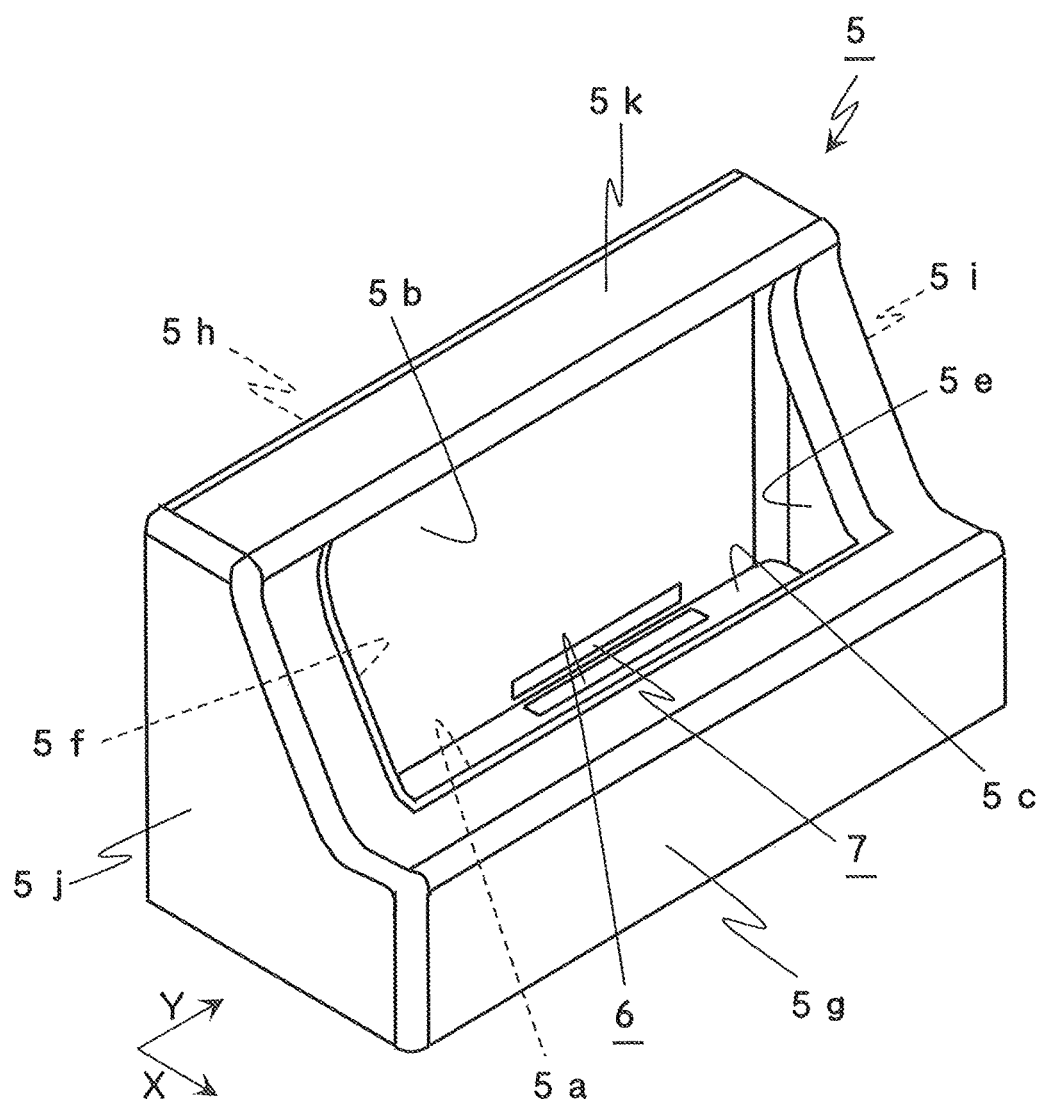
FIG. 2A is a perspective view of an expansion unit.

As described above, the PC 1 can be mounted on the expansion unit 5 capable of extending the function of the PC 1. As shown in FIG. 2A, the expansion unit 5 has a front surface 5*a*, a bottom surface 5*c*, a back surface 5*b* opposing the front surface 5*a*, an upper shell 5*k* opposing the bottom surface 5*c*, a right lateral surface 5*e*, and a left lateral surface 5*f*. Furthermore, the expansion unit 5 has a front shell 5*g* forming the forward end portion oppositely to the front surface 5*a*, a back shell 5*h* forming the backward end portion oppositely to the back surface 5*b*, a right shell 5*i* forming the rightward end portion oppositely to the right lateral surface 5*e*, and a left shell 5*j* forming the leftward end portion oppositely to the left lateral surface 5*f*. In addition, the bottom surface electrode 6 and the back surface electrode 7 are included on the bottom surface 5*c* and the back surface 5*b*, respectively. Still further, as described above, the bottom surface electrode 6 connects to the lower electrode 4 of the PC 1, and the back surface electrode 7 connects to the rear surface electrode 3 of the PC 1.

Figure 1B:
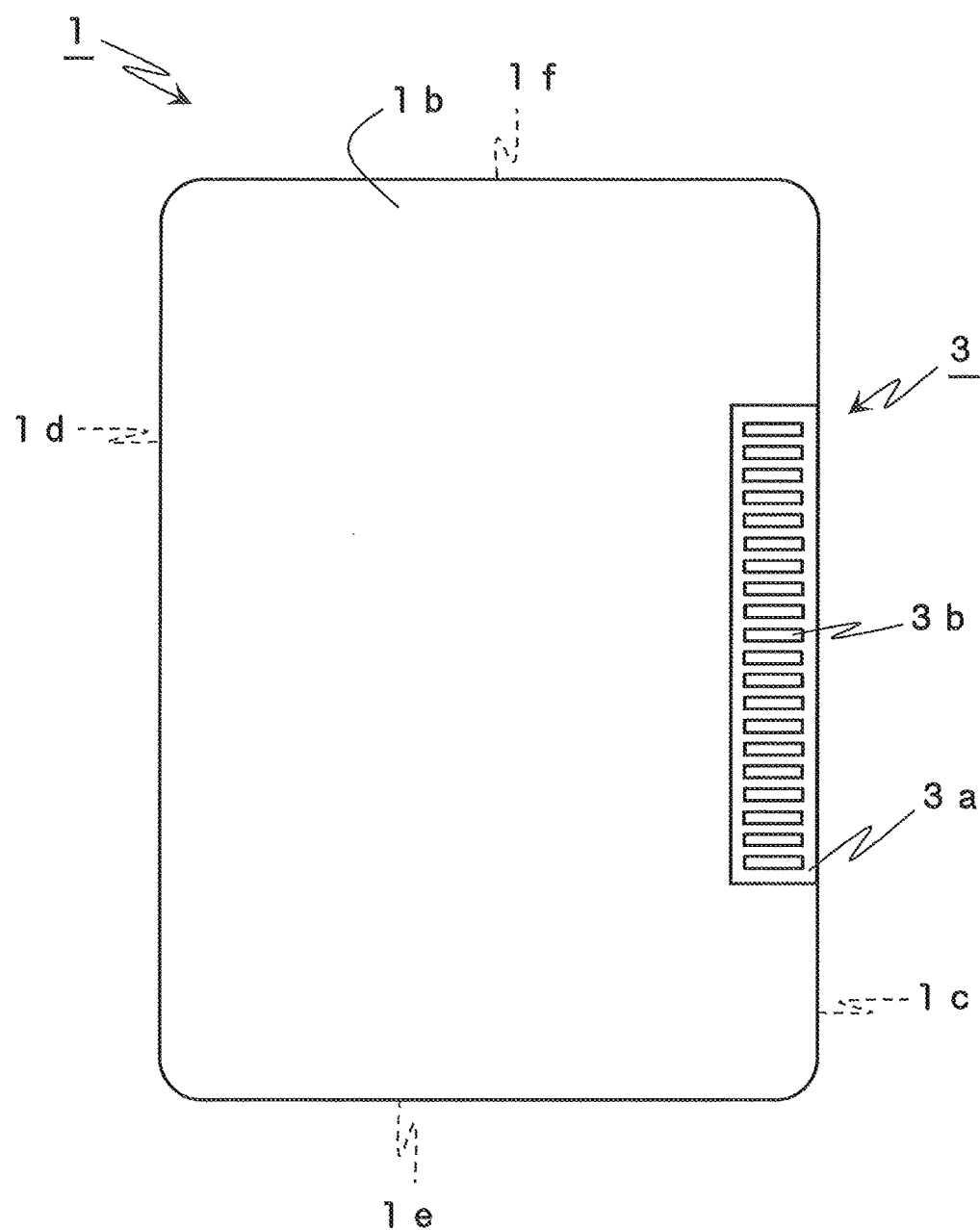
FIG. 1B is a rear view of the PC.
Figure 1C:
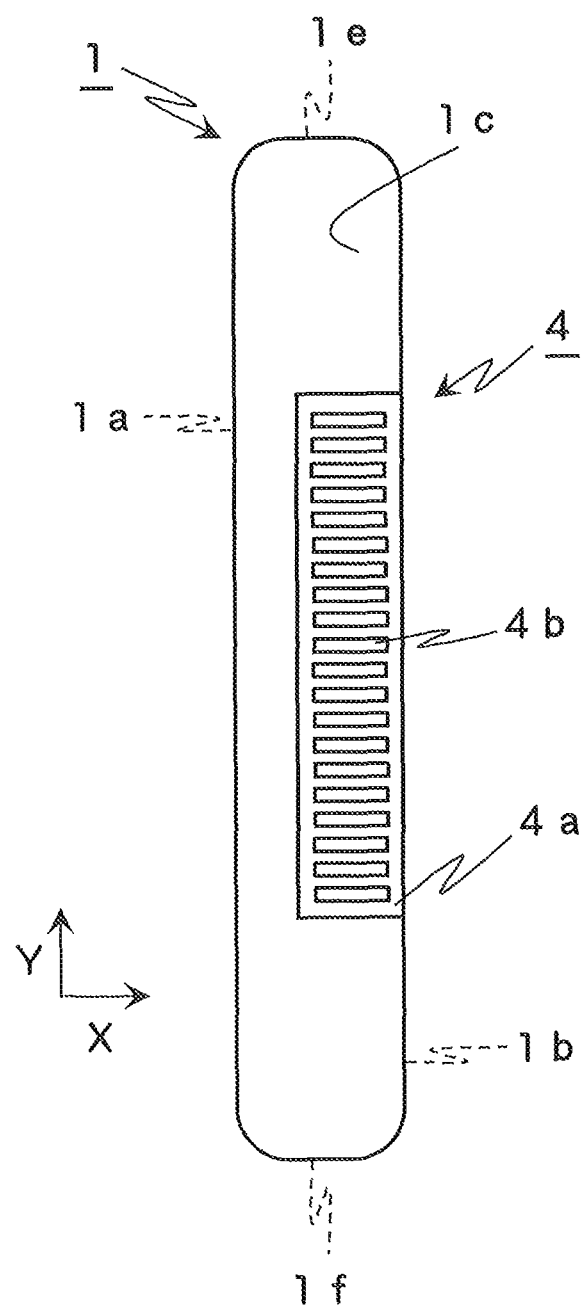
FIG. 1C is a lower lateral view of the PC.
Figure 1D:
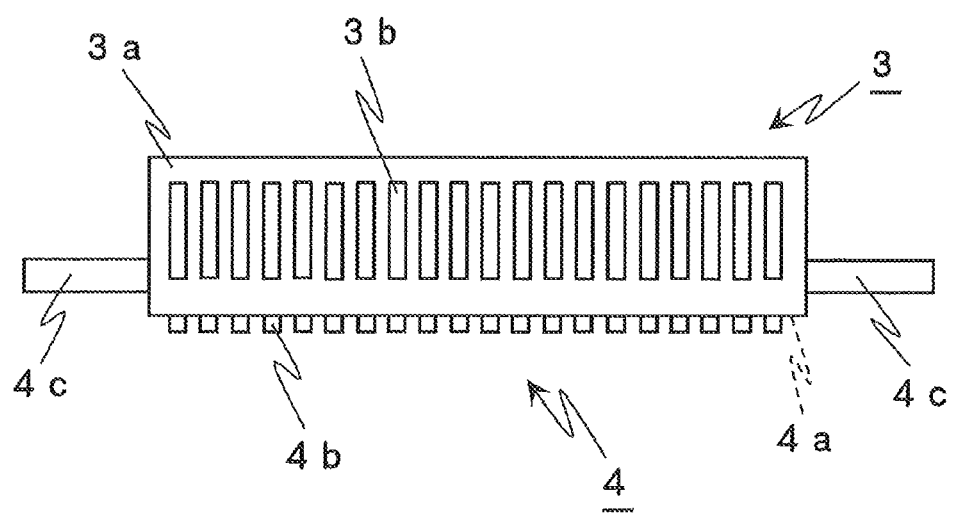
FIG. 1D is a front view of a connection terminal

The expansion unit 5, when the PC 1 shown in FIG 1A to FIG. 1C is mounted thereon, can extend the function of the PC 1. The PC 1, when connected to the expansion unit 5, becomes communicable with terminals disposed on the back shell 5*h* of the expansion unit 5. Examples of terminals included in the expansion unit 5 include terminals for supplying power that drives the PC 1, terminals for charging a secondary battery built inside the PC 1, a keyboard terminal for an input from an external keyboard, and USB (Universal Serial Bus) terminals, wired and wireless LAN (Local Area Network) terminals, and cable connector terminals for communicating information between the PC 1 and other external apparatuses.

Figure 2B:
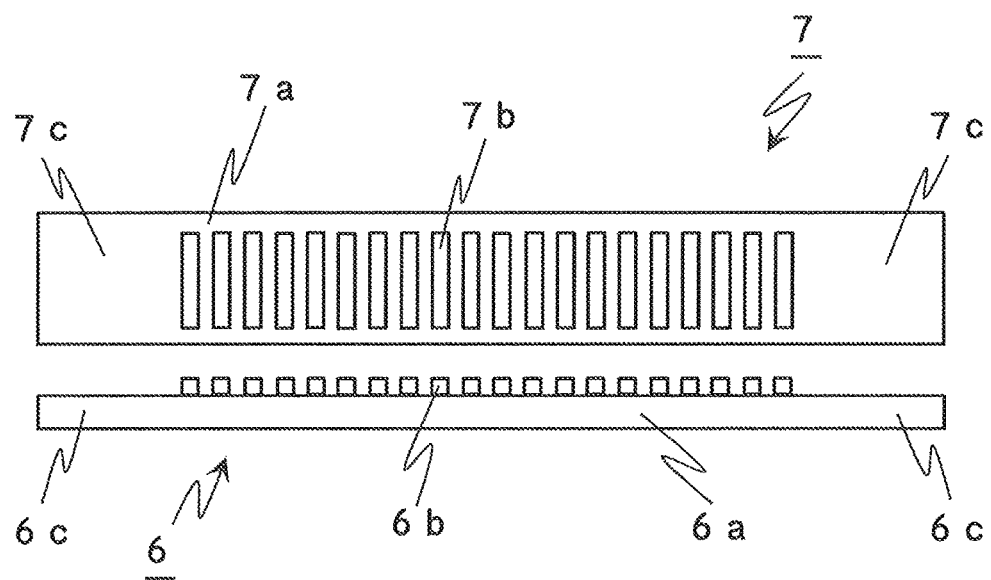
FIG. 2B is a front view of a connection terminal of the expansion unit.

The bottom surface electrode 6 and the back surface electrode 7 of the present embodiment are formed by disposing two separate terminal electrodes on the bottom surface 5*c* and the back surface 5*b* which are adjacent to each other, as shown in FIG. 2B. Electrodes 6*b* of the bottom surface electrode 6 are insulated by an insulator 6*a*. One pair of retainers 6*c* is disposed in a direction orthogonal to the longitudinal direction of the electrodes 6*b*. In addition, in the back surface electrode 7, electrodes 7*b* are insulated by an insulator 7*a*. One pair of retainers 7*c* is disposed in a direction orthogonal to the longitudinal direction of each of the electrodes 7*b*. Each of the two pairs of the retainers 6*c* and 7*c* can be formed by embedding the lower surface 5*c* and the back surface 5*b* in, or screwing, using screws, the lower surface 5*c* and the back surface 5*b* to, for example, an acrylonitrile-butadiene-styrene copolymer resin forming the shell of the expansion unit 5 (configuration of the present embodiment shown in FIG. 2A). Although the bottom surface electrode 6 and the back surface electrode 7 in the expansion unit 5 of the present embodiment are separate from each other, an intersection line formed between the back surface 5*b* and the bottom surface 5*c* may be integrally formed as an edge part (in this case, an intersection line formed between the insulators 6*a* and 7*a* is the edge part). When the bottom surface electrode 6 and the back surface electrode 7 are formed integrally, it is possible to reduce the number of parts forming the expansion unit 5. Thus, integrally forming the bottom surface electrode 6 and the back surface electrode 7 is advantageous in terms of cost.

[Mounting PC on Expansion Unit]

Figure 3A:
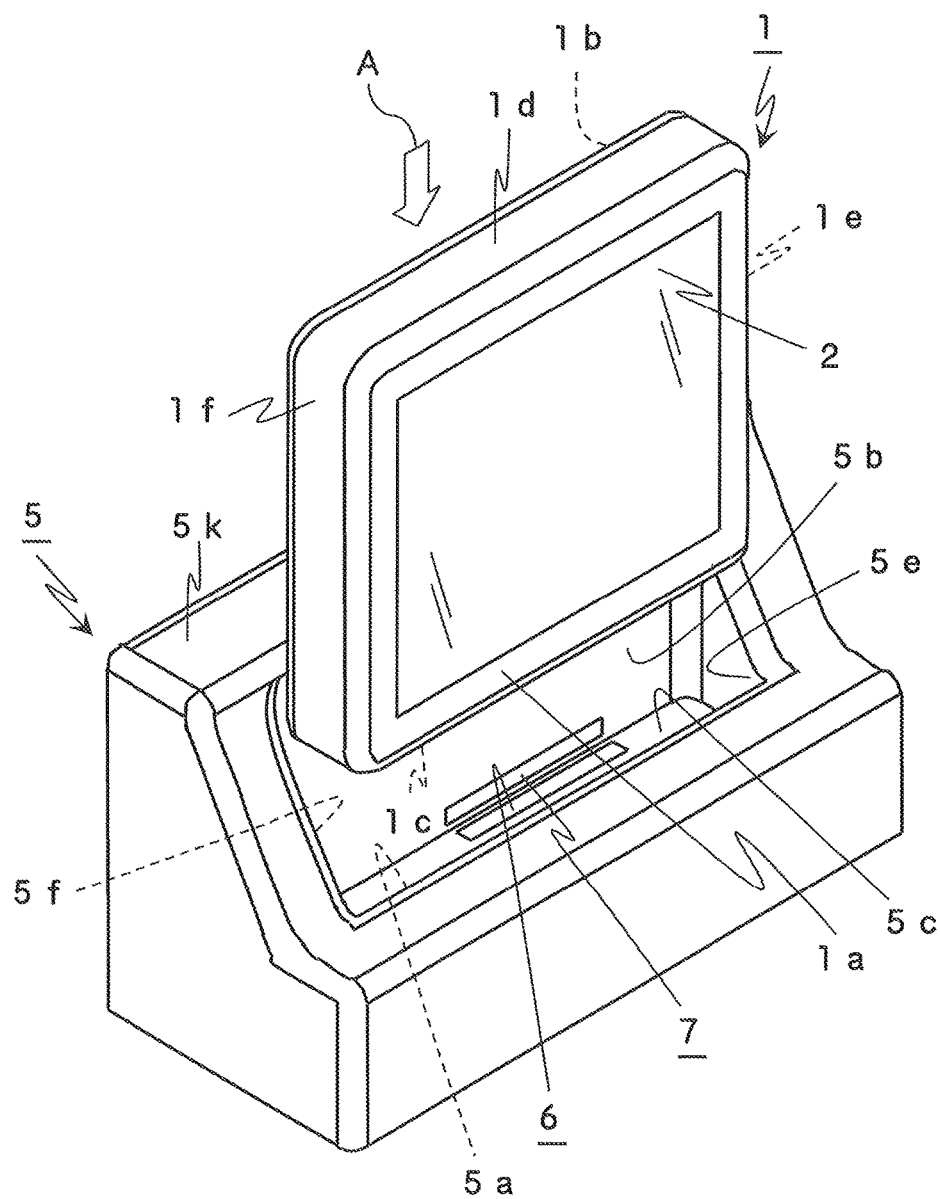
FIG. 3A is a perspective view showing a process in which the PC is mounted on the expansion unit.
Figure 3B:
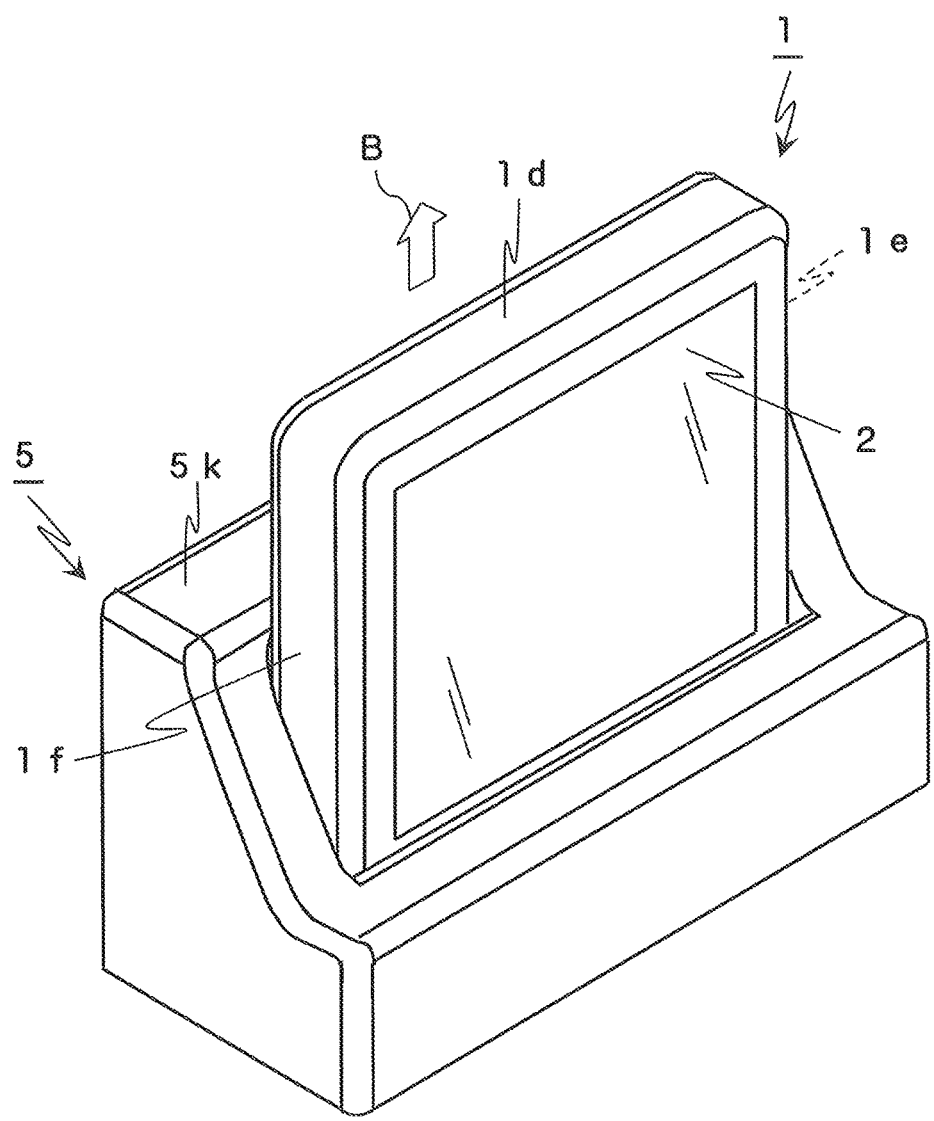
FIG. 3B is a perspective view showing the PC mounted on the expansion unit.

FIGS. 3A and 3B show a process in which the PC 1 is mounted on the expansion unit 5. As shown in FIG. 3A, in an arrow A direction, the PC 1 is inserted in the expansion unit 5 having the bottom surface electrode 6 and the back surface electrode 7. At this moment, the right surface 1*e* of the PC 1 is guided by the right lateral surface 5*e* of the expansion unit 5. In addition, the left surface 1*f* of the PC 1 is guided by the left lateral surface 5*f* of the expansion unit 5. Regarding the PC 1 guided by the right lateral surface 5*e* and the left lateral surface 5*f*, the lower electrode 4 of the PC 1 is positioned with respect to the bottom surface electrode 6 of the expansion unit 5. Then, the rear surface electrode 3 of the PC 1 is positioned with respect to the back surface electrode 7 of the expansion unit 5.

The PC 1 positioned by the right lateral surface 5*e* and the left lateral surface 5*f* of the expansion unit 5 is mounted on the expansion unit 5 as shown in FIG. 3B. At this moment, the rear surface 1*b* of the PC 1 slides on the back surface 5*b* of the expansion unit 5 to be guided. Then, the front surface 1*a* of the PC 1 makes contact with the front surface 5*a* of the expansion unit 5. When the PC 1 positioned in the manner described above is mounted on the expansion unit 5, the bottom surface electrode band the lower electrode 4 become electrically connected. At the same time, the back surface electrode 7 and the rear surface electrode 3 become electrically connected. As a result, the PC 1 and the expansion unit 5 become electrically connected. In the present embodiment, the bottom surface electrode 6 and the back surface electrode 7 electrically connect to the lower electrode 4 and the rear surface electrode 3, respectively, through a contact between so-called plate-like electrodes without accompanied by a change in shape.

It should be noted that, by pulling out the PC 1 in an arrow B direction shown in FIG. 3B, the connection is between the expansion unit 5 and the PC 1 can be severed.

[Advantageous Effects, Etc.]

The PC 1 includes, in addition to the lower electrode 4 disposed on the lower surface 1*c*, the rear surface electrode 3 included on the rear surface 1*b* of the PC 1. Associated with delegation of more functions to the PC 1, a problem may occur regarding insufficient number of terminal electrodes for connecting to external devices because of for example, the area needed by terminal electrodes of the lower electrode 4 becomes larger than the lower surface 1*c* as the number of the terminal electrodes increases. By having the above described configuration, the problem can be solved by disposing the terminal electrodes on the rear surface 1*b* as the rear surface electrode 3 in accordance with the increase in the number of terminal electrodes. More specifically, when the number of terminal electrodes along the interval between, for example, the right surface 1*e* and the left surface 1*f* in FIG. 1C (Y direction) is increased, the area of the lower electrode 4 increases. Then, the flatness of the lower electrode 4 in the Y direction becomes more variable, easily. As a result, inferior connection may occur. Furthermore, elongating the lower surface 1*c* in the Y direction leads to enlargement of the PC 1. In addition, reducing the length of the terminal electrodes along the interval between the front surface 1*a* and the rear surface 1*b* in FIG. 1C (X direction) cause inferior connection to occur easily. Still further, arranging the terminal electrodes in, for example, two rows while maintaining their lengths leads to a larger thickness of the PC 1 in the X direction. The result is enlargement of the PC 1. On the other hand, with the PC 1 having the additional rear surface electrode 3 in addition to the lower electrode 4, it is possible to maintain fine connectivity of the terminal electrodes without increasing the area of the lower surface 1c of the PC 1. In addition, when an increase in the number of the terminal electrode with respect to the number on the lower electrode 4 in response to delegation of more functions to the PC 1 is allocated to the rear surface electrode 3, it is not necessary to enlarge the area of the lower surface 1c of the PC 1. Thus, when added functions associated with delegation of more functions are not used, the PC can be mounted on, for example, an expansion unit dedicated for a conventional tablet type computer not delegated with more functions.

Delegation of more functions to the PC 1 relates to the type of external apparatuses that are to be connected, and the type of wireless communication, etc. Examples of the external apparatuses include an external display for improving visibility of the display panel 2 included in the PC 1, an external keyboard for inputting control signals, etc., to the PC 1, and transmission between hard disk drives built in the PC 1 and other PCs, and external hard disk drives, etc. As types of communication, specifications such as wireless LAN (Local Area Network), wireless WAN (Wide Area Network), Bluetooth (Registered trademark), and WiMAX (Worldwide Interoperability for Microwave Access) are established in accordance with the communication range. Associated with diversification of functions the PC 1 as described above, connection electrode terminals (the lower electrode 4 and the bottom surface electrode 6, and the rear surface electrode 3 and the back surface electrode 7) are each assigned as a dedicated terminal. As a result, for example, the number of connection terminals increases in association with an increase in the types of communication performed by the PC 1. With the configuration in which the added connection terminals are included as the rear surface electrode 3, it is possible to handle mounting on an expansion unit supporting a conventional tablet type computer not supporting the increase in the types of communication, and mounting on the expansion unit 5 supporting the added type of communication. Thus, mounting on an expansion unit with a conventional configuration can be supported through a connection between the lower electrode 4 and the bottom surface electrode 6, whereas, when an added communication function is to be used, a communication function of the PC 1 can be supported through a connection between the rear surface electrode 3 and the back surface electrode 7 through mounting on the expansion unit 5. It should be noted that, in the description above, although a PC without being delegated with more functions and having a conventional configuration only includes the lower electrode 4, the same also applies when only the rear surface electrode 3 is included.

Although description about the configuration of the PC 1 has been provided above, the same applies also for the expansion unit 5, and enlargement of the expansion unit 5 can be prevented by simply arranging, on the back surface electrode 7, the number of terminal electrodes in shortage to the bottom surface electrode 6. More specifically, when the number of terminal electrodes along the interval between, for example, the right lateral surface 5e and the left lateral surface 5f in FIG. 2A (Y direction) is increased, the area of the bottom surface electrode 6 increases, and area and flatness thereof in the Y direction becomes more variable, easily. As a result, inferior connection may occur. Furthermore, elongating the bottom surface 5c in the Y direction leads to enlargement of the expansion unit 5. Furthermore, arranging the terminal electrodes in, for example, multiple rows along the interval between the front surface 5a and the back surface 5b (X direction) leads to an increase in the area and the length, in the X direction, of the bottom surface electrode 6. This results in the enlargement of the expansion unit 5. Furthermore, for the purpose of maintaining the length of the bottom surface 5c of the expansion unit 5 in the X direction, reducing the length of the bottom surface electrode 6 may lead to inferior electrical connection. On the other hand, with the expansion unit 5 in which the increase in the number of the electrodes 6b of the bottom surface electrode 6 is allocated to the electrodes 7b of the back surface electrode 7, it is possible to support the PC 1 delegated with more functions. It should be noted that, in the description above, although an expansion unit without being delegated with more functions and having a conventional configuration only includes the bottom surface electrode 6, the same also applies when only the back surface electrode 7 is included.

Figure 4A:
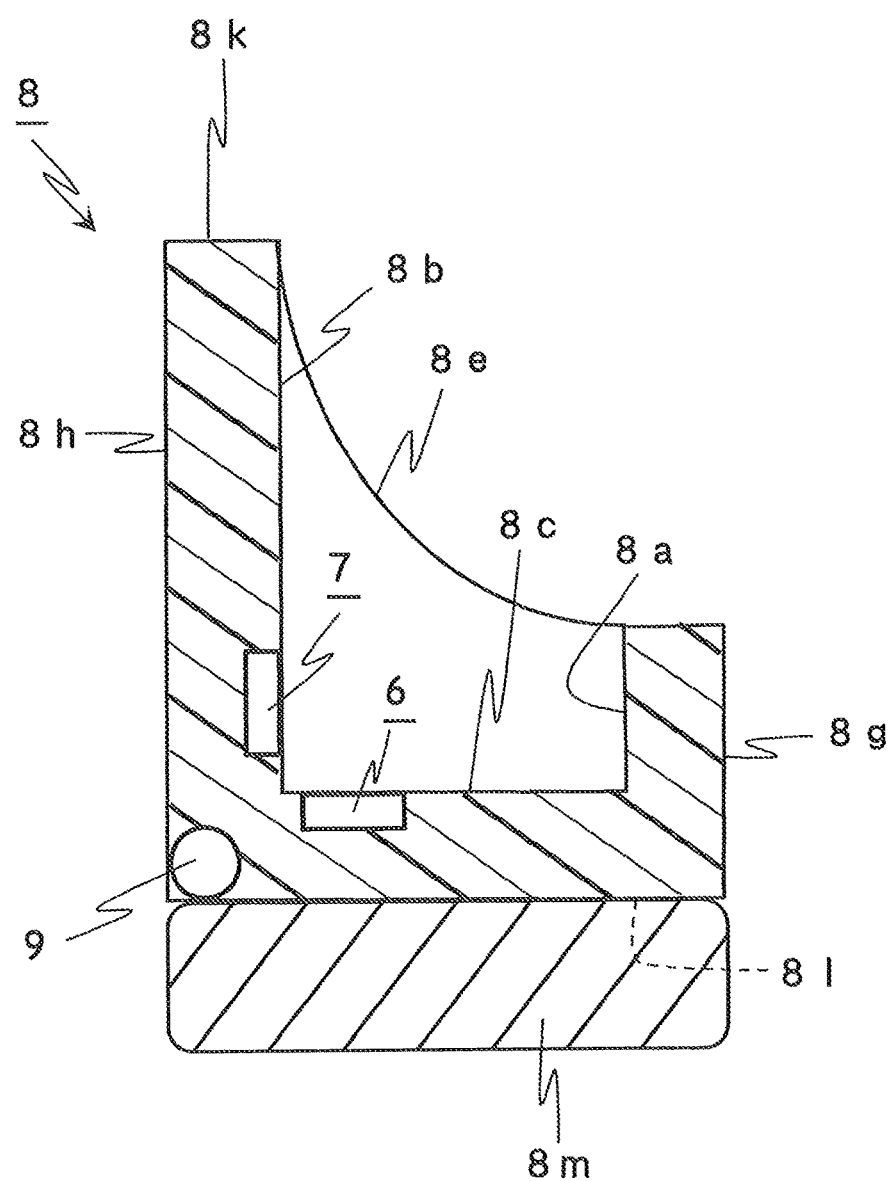
FIG. 4A is a sectional side view of another expansion unit.
Figure 4B:
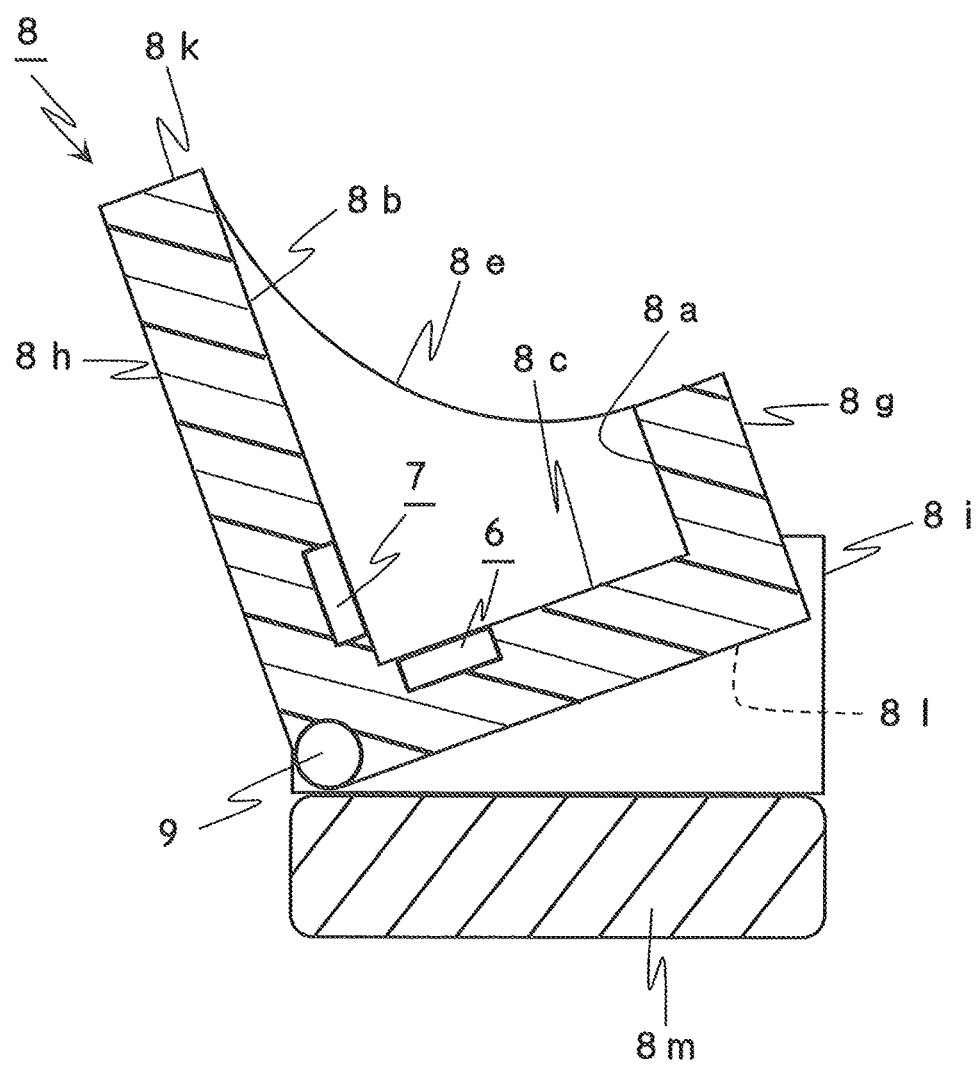
FIG. 4B is a sectional side view of the expansion unit.

The angle formed between the bottom surface 5c and the front surface 5a and the angle formed between the bottom surface 5c and the back surface 5b in the expansion unit 5 can be respectively configured in accordance with the angle formed between the lower surface 1c and the front surface 1a and the angle formed between the lower surface 1c and the rear surface 1b in the PC 1. It should be noted that a part linking the lower surface 1c and the front surface 1a and a part joining the lower surface 1c and the rear surface 1b in the PC 1 are chamfered smoothly as shown in FIGS. 3A and 3B. However, the angle of the front surface 1a with respect to the lower surface 1c and the angle of the rear surface 1b with respect to the lower surface 1c in the PC 1 are each 90°. Thus, as shown in FIGS. 4A and 4B, when the angle of a front surface 8a with respect to a bottom surface 8c and the angle of a back surface 8b with respect to the bottom surface 8c in the expansion unit 5 are also each 90°; the expansion unit 5 can also allow mounting and usage of, for example, other PCs having a lower electrode 4 other than that of the PC 1.

In the present embodiment, the basic connection terminals, included in the expansion unit 5 having the PC 1 mounted thereon, such as USB terminals and charging terminals for charging a secondary battery built into the PC 1, are disposed on both the bottom surface electrode 6 of the expansion unit 5 and the lower electrode 4 of the PC 1 in a manner similar to a conventional configuration. As described above, terminal electrodes of the PC 1 added in association with delegation of more functions to the PC 1 are disposed on the rear surface electrode 3 as the electrodes 3b. Furthermore, connection terminals of the expansion unit 5 electrically connecting to the terminal electrodes added in association with delegation of more functions to the PC 1 are disposed on the back surface electrode 7. Thus, a group of connection terminals fundamentally included in the PC 1 such as the charging terminal are standardized with respect to a general tablet type personal computer and expansion unit and are assigned to the lower electrode 4 and the bottom surface electrode 6, whereas a group of connection terminals related to added functions are consolidated and integrated to the newly added rear surface electrode 3 and bottom surface electrode 6 as a group of connection terminals related to data communication. More preferably, the group of terminals for the charging function and the group of terminals for the data-communication function are integrated on separate surfaces of the PC 1. For example, the terminals for the communication function are preferably integrated on the rear surface electrode 3, and the terminals for the charging function are preferably integrated on the lower electrode 4. By having such a configuration, an expansion unit that supports only one of charging function and extension function may have a reduced size.

In the present embodiment, as shown in FIGS. 1B to 1D and 2B, the electrodes 4b of the lower electrode 4 and the electrodes 3b of the rear surface electrode 3 disposed on the PC 1, and the electrodes 6b of the bottom surface electrode 6 and the electrodes 7b of the back surface electrode 7 disposed on the expansion unit 5 have a plate-like electrode shape in which an electrically conductive state is achieved simply through contact. By using the plate-like electrode shape, the PC 1 and the expansion unit 5 can be electrically connected easily by the weight of the PC 1 itself. Furthermore, the configuration in which the electrodes 3b and the electrodes 4b of the PC 1 are placed on the electrodes 7b and 6b of the expansion unit 5 provides resistance to sideward shifting of the PC 1 caused when the PC 1 is, for example, mounted on or removed from the expansion unit 5, when compared to a conventional configuration in which connection is formed through mechanical engagement such as with a convex shaped male connector and a concave shaped female connector, for example. In the connection of a plug-in type as in the example of the above described connector, a connection completed state is reached via a guiding process involving shifting movement of terminals in a connection guide such as an engagement section. On the other hand, the connection of the contact type as conducted between the electrodes 3b and the electrodes 7b and between the electrodes 4b and the electrodes 6b is achieved without shifting movement of terminals for guidance to the connection completed state.

Furthermore, in the present embodiment, as shown in FIG. 1D, the insulator 3a of the rear surface electrode 3 and the insulator 4a of the lower electrode 4 are formed so as to share a common insulator. By having this configuration, the electrodes 3b arranged on the rear surface electrode 3 and the electrodes 4b arranged on the lower electrode 4 can be arranged by simply mounting the PC 1 without any positioning. This is merely one example, and separate members may also be used. Furthermore, as shown in FIGS. 2A and 2B, although the insulator 6a of the bottom surface electrode 6 and the insulator 7a of the back surface electrode 7 in the expansion unit 5 are separate members in the present embodiment, this is merely one example, and the insulators may also be formed so as to share a common insulator.

Embodiment 2

[Configuration of Expansion Unit]

FIGS. 4A and 4B show cross-sectional lateral views of an expansion unit 8 on which the PC 1 of the present embodiment is mounted. The expansion unit 8 includes the front surface 8a, the back surface 8b, the bottom surface 8c, a right lateral surface 8e, a front shell 8g, a back shell 8h, a right shell 8i, an upper shell 8k, a lower shell 8l, and a main body 8m. The back surface 8b is disposed opposingly to the front surface 8a via the bottom surface 8c. The right lateral surface 8e is disposed from an end of the front surface 8a opposing the bottom surface 8c to the upper shell 8k opposing the bottom surface 8c in the back surface 8b, and has a shape curved toward the bottom surface 8c. It should be noted that a left lateral surface 8f parallelly opposing the right lateral surface 8e is also included, but is not represented in FIGS. 4A and 4B since FIGS. 4A and 4B are cross sectional views. In addition, the front shell 8g is forming the forward end portion oppositely to the front surface 8a. The back shell 8h is forming the backward end portion oppositely to the back surface 8b. The right shell 8i is forming the rightward end portion oppositely to the right lateral surface 8e. It should be noted that a left shell 8j parallelly opposing the right shell 8i is also included, but is not represented in FIGS. 4A and 4B since FIGS. 4A and 4B are cross sectional views. The upper shell 8k is disposed above the bottom surface 8c. Furthermore, the bottom surface electrode 6 and the back surface electrode 7 are respectively disposed on the bottom surface 8c and the back surface 8b. As described above, the bottom surface electrode 6 is to be connected to the lower electrode 4 of the PC 1. The back surface electrode 7 is to be connected to the rear surface electrode 3 of the PC 1. The above described configuration of the expansion unit 8 is basically similar to that of the expansion unit 5 shown in FIG. 2A.

In the expansion unit 8, the front shell 8g, the front surface 8a, the bottom surface 8c, the back shell 8h, the back surface 8b, and the lower shell 8l are formed from a separate member of the main body 8m. The lower shell 8l opposing the bottom surface 8c below is rotatably supported with respect to the main body 8m of the expansion unit 8 by a rotation shaft 9. The rotation shaft 9 is formed on the back shell 8h side of the boundary between the back shell 8h and the main body 8m. When the back surface 8b is pressed, the bottom surface 8c is tilted with respect to the main body 8m as shown in FIG. 4B. Alternatively, as described later, after the PC 1 is mounted on the expansion unit 8 in a state of FIG. 4A, when the vicinity of the upper surface 1d (see FIG. 3B) of the PC 1 is pressed, the bottom surface 8c is also tilted with respect to the main body 8m. It should be noted that the rotation shaft 9 includes a general rotation stopping mechanism for enabling the bottom surface 8c to be held at the tilted position shown in FIG. 4B, such as, for example, a torque mechanism or a gear, etc.

Since the configuration of the lower electrode 4 and the rear surface electrode 3 of the PC 1, and the bottom surface electrode 6 and the back surface electrode 7 of the expansion unit 8 are similar to those of Embodiment 1; description thereof is omitted.

[Mounting PC on Expansion Unit]

Figure 4C:
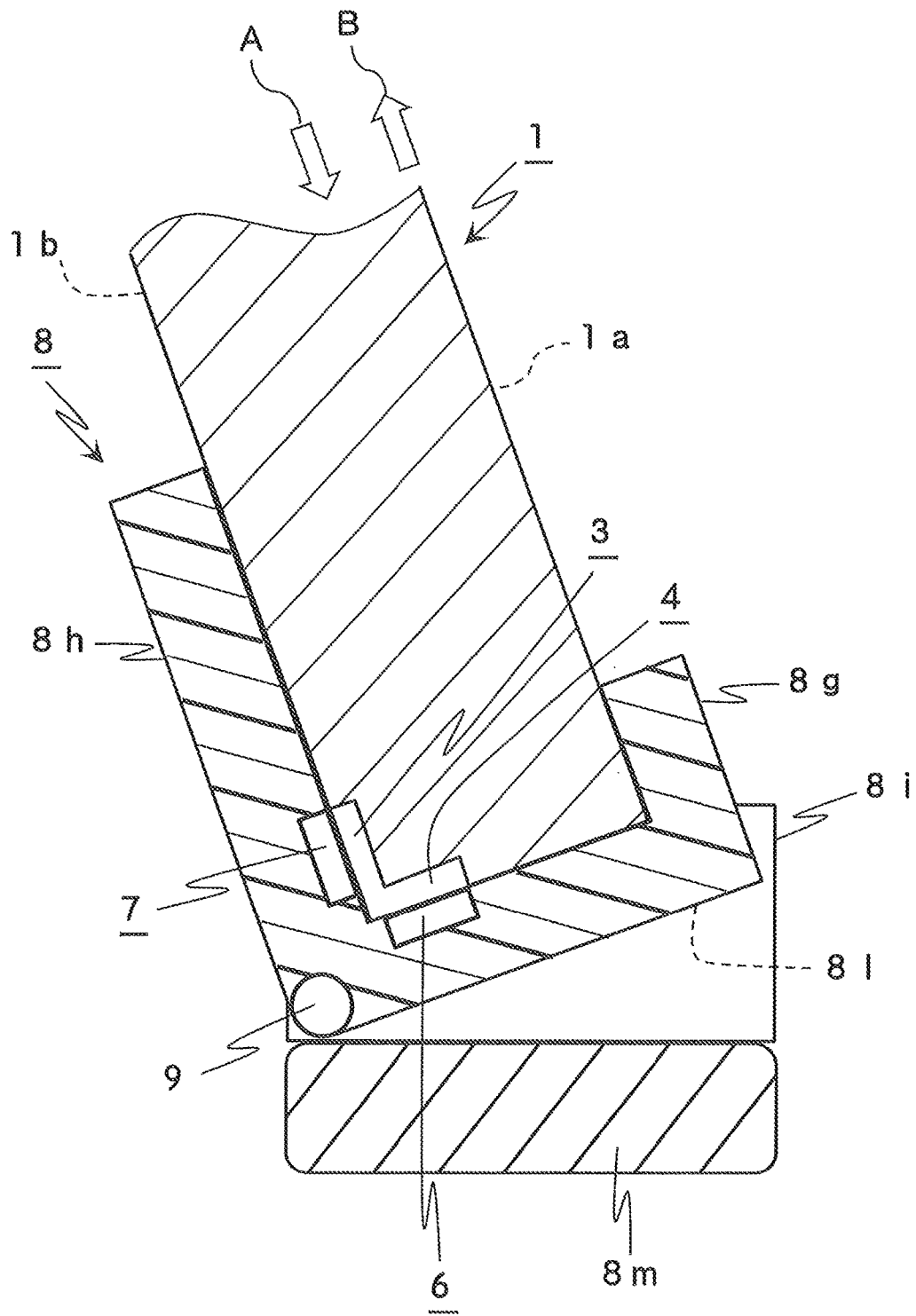
FIG. 4C is a sectional side view showing the PC mounted on the expansion unit.

FIGS. 4A to 4C show one example of a process of mounting the PC 1 on the expansion unit 8. The expansion unit 8 is shifted from the state of FIG. 4A to the state of FIG. 4B, and the bottom surface 8c and the back surface 8b are tilted with respect to the main body 8m. In this state, the PC 1 is inserted in the arrow A direction as shown in FIG. 4C. At this moment, the rear surface 1b of the PC 1 is guided by the back surface 8b of the expansion unit 8. In addition, the right surface 1e of the PC 1 is guided by the right lateral surface 8e of the expansion unit 8 (similarly, the left surface 1f of the PC 1 is guided by the left lateral surface 8f of the expansion unit 8.). Regarding the PC 1 guided by the back surface 8b, the right lateral surface 5e, and the left lateral surface 5f; the lower electrode 4 of the PC 1 is positioned with respect to the bottom surface electrode 6 of the expansion unit 8. Similarly, the rear surface electrode 3 of the PC 1 is positioned with respect to the back surface electrode 7 of the expansion unit 8.

As shown in FIG. 4C, the PC 1 is positioned by the back surface 8b, the right lateral surface 8e, and the left lateral surface 8f of the expansion unit 8, and mounted on the expansion unit 8. Since the manner in which the PC 1 is guided by the expansion unit 8 to cause contact between electrodes is similar to that in Embodiment 1, description thereof is omitted. When compared to the embodiment described above, in the present embodiment, the bottom surface 8c and the back surface 8b of the expansion unit 8 are tilted with respect to the main body 8m. Thus, the lower electrode 4 and the bottom surface electrode 6, and the rear surface electrode 3 and the back surface electrode 7 can be connected with more certainty because of a component force generated by the weight of the PC 1 itself depending on the angle of tilt of the expansion unit 8 with respect to the main body 8*m*.

It should be noted that, by pulling out the PC 1 in the arrow B direction shown in FIG. 4C, the connection between the expansion unit 8 and the PC 1 can be severed.

[Advantageous Effects, Etc.]

The PC 1 includes, in addition to the lower electrode 4 disposed on the lower surface 1*c*, the rear surface electrode 3 included on the rear surface 1*b* of the PC 1. By having this configuration, the following advantageous effects can be obtained in addition to advantageous effects similar to those of Embodiment 1.

The expansion unit 8 of the present embodiment is formed such that the bottom surface 8*c* and the back surface 8*b* are tilted with respect to the main body 8*m*. By tilting the expansion unit 8, the weight of the PC 1 itself generates a component force depending on a tilt angle. As a result of the component force, the rear surface electrode 3 and the back surface electrode 7 are electrically connected with more certainty. In addition, the PC 1 can be mounted on the expansion unit 8 with certainty because of engagement between the rear surface 1*b* of the PC 1 and the back surface 8*b* of the expansion unit 8, the right surface 1*e* of the PC 1 and the right lateral surface 8*e* of the expansion unit 8, and the left surface 1*f* of the PC 1 and the left lateral surface 8*f* of the expansion unit 8. The tilt angle can be set at an angle that provides sure connectivity between the rear surface electrode 3 and the back surface electrode 7 and that enables a user to easily view the display panel 2 of the PC 1. Thus, when the angle formed between the lower shell 81 and the main body 8*m* is set at, for example, 30° (tilt angle of the display panel 2 is 120°); a load of the lower electrode 4 applied with respect to the bottom surface electrode 6 is equal to the weight of the PC 1 times cos 30 degrees, and a load of the rear surface electrode 3 applied with respect to the back surface electrode 7 is equal to the weight of the PC 1 times sin 30 degrees. Since the terminal electrodes are pressed to each other with a component force of the weight of the PC 1, a sure connection is obtained. Thus, when the angle formed by the front surface 1*a* of the PC 1 is set at an obtuse angle with respect to the main body 8*m* of the expansion unit 8, a configuration in which the user can easily view the display panel 2 can be obtained.

Regarding the tilt angle of the expansion unit 8, the bottom surface 8*c* may be tilted from the beginning to a predetermined angle (e.g., 30° in the example described above) with respect to the main body 8*m*. By using this configuration, the rotation shaft 9 included in the expansion unit 8 can be omitted, and the cost of the expansion unit can be reduced.

Description has been provided regarding the expansion unit 8 of the present embodiment having the right shell 8*i* disposed opposingly to the right side of the right lateral surface 8*e* for guiding the right surface 1*e* of the PC 1 (although diagrammatic representation is omitted, the same applies for the left shell 8*j* disposed opposingly to the left side of the left lateral surface 8*f* for guiding the left surface 1*f*). However, this is merely one example, and, for example, when the right lateral surface 8*e* and the left lateral surface 8*f* for guiding the right surface 1*e* and the left surface 1*f* of the PC 1 are included, the right shell 8*i* and the left shell 8*j* may be omitted. With such a configuration, reduction of weight and cost of the expansion unit 8 becomes possible.

Modification 1

[Modification of Electrode in Expansion Unit]

Figure 5:
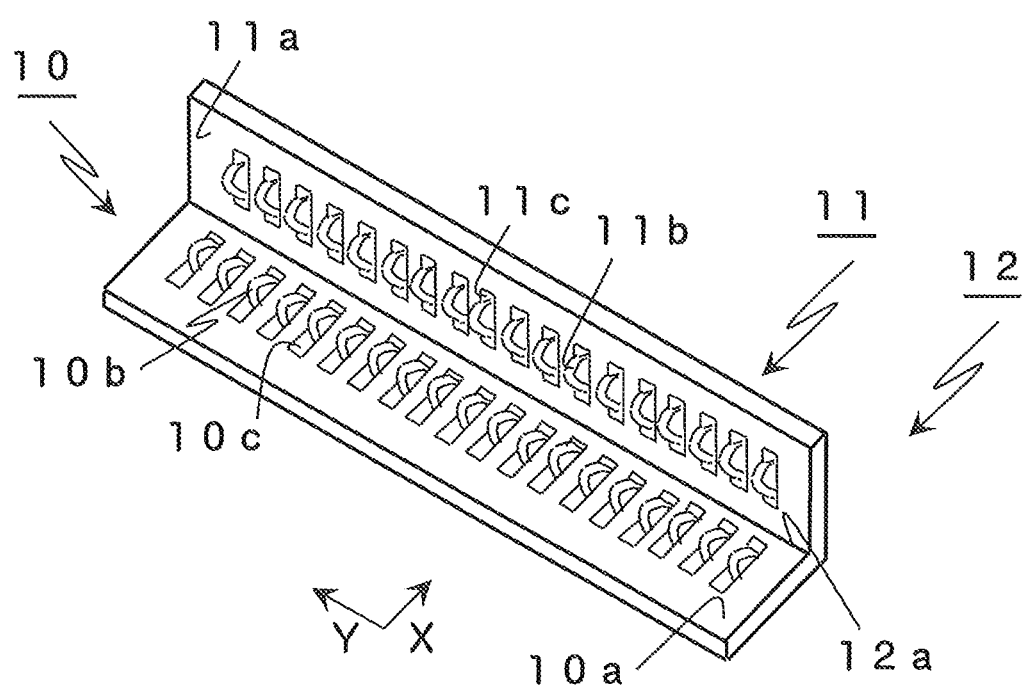
FIG. 5 is a perspective view of another configuration of a connection-target terminal in the expansion unit.

A modification that can be applied to the above described embodiment will be shown in the following. In each of the embodiments described above, the bottom surface electrode 6 and the back surface electrode 7 of the expansion units 1 and 8 have been described as having a plate-like electrode configuration in which electrical connection is formed through contact. Thus, the electrodes 6*b* and the electrodes 7*b* become electrically connected when the terminal electrodes connect to each other without associated with any change in their respective shapes. In addition, the lower electrode 4 and the rear surface electrode 3 of the PC 1 have been described as having a plate-like electrode configuration in which electrical connection is formed through contact. Thus, the electrodes 4*b* and the electrodes 3*b* become electrically contacted when the terminal electrodes connect to each other without associated with any change in their respective shapes. However, this configuration is merely one example, and the terminal electrodes may be formed to have so-called spring characteristic of having mechanical restorability. FIG. 5 shows one example of an expansion unit electrode 12 of the present embodiment. The expansion unit electrode 12 can be adapted to the expansion units 5 and 8 (hereinafter, described as the expansion unit 5 in the present embodiment). A bottom surface electrode 10 included in the expansion unit electrode 12 includes an insulator 10*a*, elastic electrodes 10*b* whose surrounding area is covered with the insulator 10*a* and that have restorability against pressure, and penetration holes 10*c* in which the elastic electrodes 10*b* are housed. A back surface electrode 11 included in the expansion unit electrode 12 includes an insulator 11*a*, elastic electrodes 11*b* whose surrounding area is covered with the insulator 11*a* and that have restorability against pressure, and penetration holes 11*c* in which the elastic electrodes 11*b* are housed. It should be noted that although the expansion unit electrode 12 has a shape in which the bottom surface electrode 10 and the back surface electrode 11 are integrated at an edge part 12*a* between the insulators 10*a* and 11*a*, this is merely one example, and the insulators 10*a* and 11*a* may be separately formed. Furthermore, the bottom surface electrode 10 and the back surface electrode 11 integrated at the edge part 12*a* may be fixed by having, for example, one pair of retainers in the Y direction in which the penetration holes 10*c* of the insulator 10*a* are arranged along the edge part 12*a* as described with reference to FIG. 1D, and embedding the electrodes in a resin forming the outline of the bottom surfaces 5*c* and 8*c* of the expansion units 5 and 8.

[Operation of Electrode According to Modification]

Figure 6A:
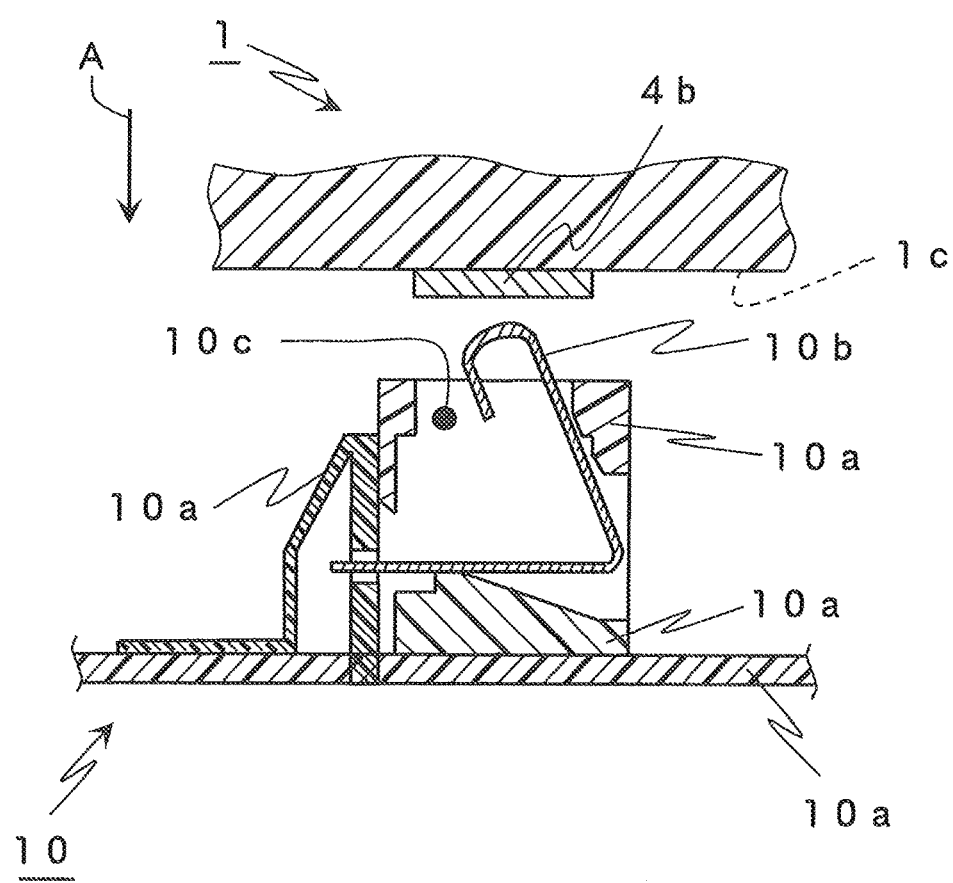
FIG. 6A is a sectional side view showing a process in which the connection-target terminal is connected.
Figure 6B:
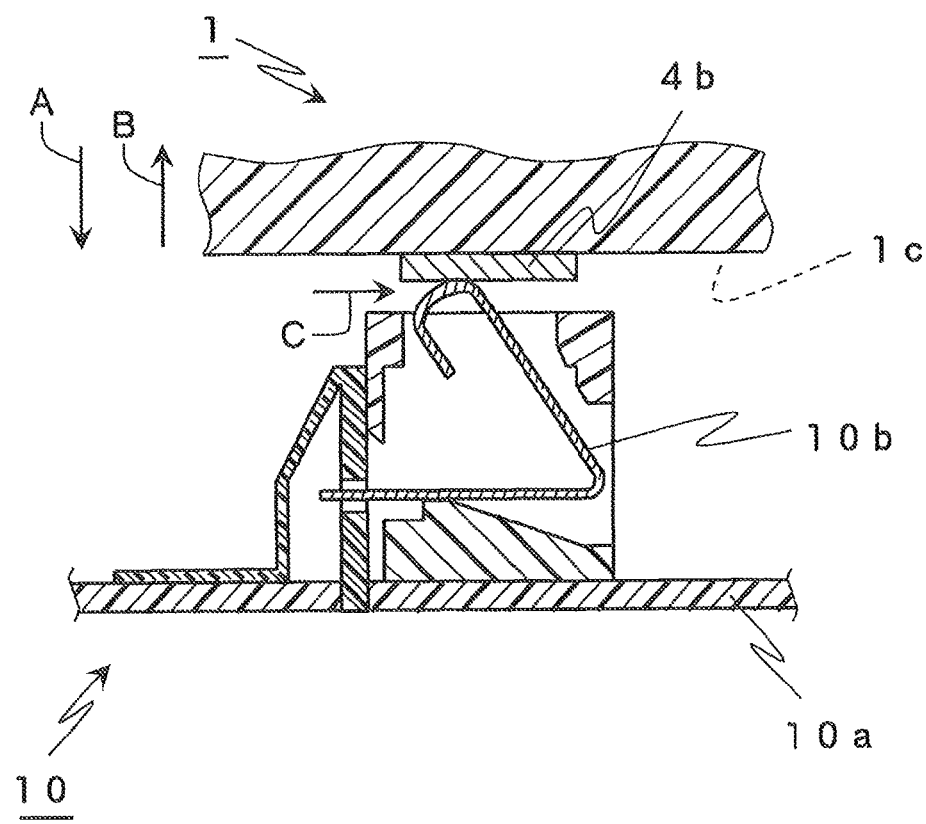
FIG. 6B is a sectional side view of the connection-target terminal after being connected.

FIGS. 6A and 6B show, using the connection between the bottom surface electrode 10 and the lower electrode 4 as one example, a process of connecting terminal electrodes to the PC 1 when the PC 1 is mounted on the expansion unit 5 on which the expansion unit electrode 12 is disposed. FIGS. 6A and 6B each show a cross section obtained by sectioning perpendicular to the Y direction in FIG. 5. As shown in FIG. 6A, when the PC 1 is being mounted on the expansion unit 5 in the arrow A direction, associated with the PC 1 approaching in the arrow A direction, the electrodes 4*b* make contact with the elastic electrodes 10*b* at positions protruded outermost from the penetration holes 10*c*. When the electrodes 4*b* make contact with the elastic electrodes 10*b*, the elastic electrodes 10*b* deform by the weight of the PC 1 as shown in FIG. 6B. Associated with this deformation, a restoring force in the arrow B direction is generated in the elastic electrodes 10*b*. Since the elastic electrodes 10*b* have the restoring force in the arrow B direction, the electrodes 4*b* and the elastic electrodes 10b become electrically connected with more certainty. Upon removing the PC 1 from the expansion unit 5, when the PC 1 is pulled out in the arrow B direction, the elastic electrodes 10b restore the state shown in FIG. 6A.

In the present modification, the elastic electrodes 10b are formed from cantilever springs. Thus, the restoring force of the elastic electrodes 10b includes not only a component in the B direction but also a restoring force in a C direction which is a direction orthogonal to the B direction. In the present modification, this restoring force in the C direction is directed so as to assist connection between the back surface electrode 11 and the rear surface electrode 3. More specifically, the restoring force of the elastic electrodes 10b acts in a direction from the elastic electrodes 10b toward the electrodes 4b of the lower electrode 4, as well as in a direction from the elastic electrodes 11b toward the electrodes 3b of the rear surface electrode 3. Thus, the PC 1 is subjected to a repulsive force generated by the elastic electrodes 10b from the bottom surface side toward the rear surface side.

The configuration of the elastic electrodes 10b is also applicable for the connection between the back surface electrode 11 and the rear surface electrode 3. Thus, by forming the back surface electrode 11 with, for example, a material having spring characteristic as the elastic electrodes 11b, the electrodes can be connected with more certainty. In addition, for example, by forming the back surface electrode 11 represented by the elastic electrodes 11b with cantilever springs, and generating the restoring force not only in the horizontal direction but also in the downward direction; the lower electrode 4 can be assisted in making contact with the bottom surface electrode 6 or the elastic electrodes 10b. In this case, the elastic electrodes 11b may have a restoring force in an opposite direction of the C direction and a restoring force in the A direction. With this, the PC 1 is subjected to a repulsive force generated by the elastic electrodes 11b from the rear surface side toward the bottom surface side.

Figure 7:
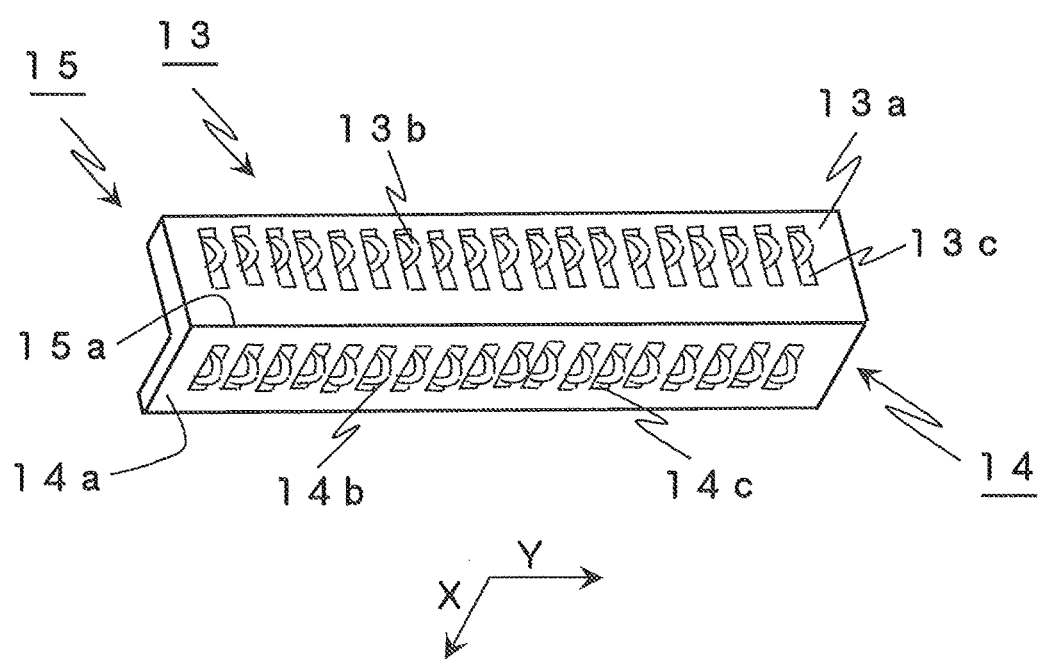
FIG. 7 is a perspective view of another connection terminal on the PC.

Furthermore, the electrodes that have restorability against deformation can also be applied for the terminal electrodes of the PC 1, and an example applying thereof to a PC electrode 15 is shown in FIG. 7. The PC electrode 15 includes a rear surface electrode 13 and a lower electrode 14. The rear surface electrode 13 includes an insulator 13a, elastic electrodes 13b whose surrounding area is covered with the insulator 13a and that have restorability against pressure, and penetration holes 13c in which the elastic electrodes 13b are housed. Furthermore, the lower electrode 14 includes an insulator 14a, elastic electrodes 14b whose surrounding area is covered with the insulator 14a and that have restorability against pressure, and penetration holes 14c in which the elastic electrodes 14b are housed. It should be noted that although the PC electrode 15 has a shape in which the rear surface electrode 13 and the lower electrode 14 are integrated at an edge part 15a between the insulators 13a and 14a, this is merely one example, and the insulators 13a and 14a may be separately formed. Furthermore, the rear surface electrode 13 and the lower electrode 14 integrated at the edge part 15a may be fixed by having, for example, one pair of retainers in the Y direction in which the penetration holes 14c of the insulator 14a are arranged along the edge part 15a, and embedding (configuration of the present embodiment) or screwing, using screws, etc., the electrodes in a resin forming the outline of the lower surface 1c of the PC 1.

When the PC 1 including the PC electrode 15 is mounted on the expansion unit 5, the elastic electrodes 13b and 14b respectively connect to the electrodes 6b of the bottom surface electrode 6 and the electrodes 7b of the back surface electrode 7 in a corresponding manner. Since the manner how the elastic electrodes 13b and 14b connect to the electrodes 5b and 7b is similar to those of the elastic electrodes 10b and 11b described above, description thereof is omitted. It should be noted that when such an electrode is disposed on the PC 1, the electrode protrudes from the PC 1. In order to protect this protruding electrode, the elastic electrodes 13b and 14b may be covered with a cover.

Modification 2

A modification that can be applied to the above described embodiment will be shown in the following.

Figure 8A:
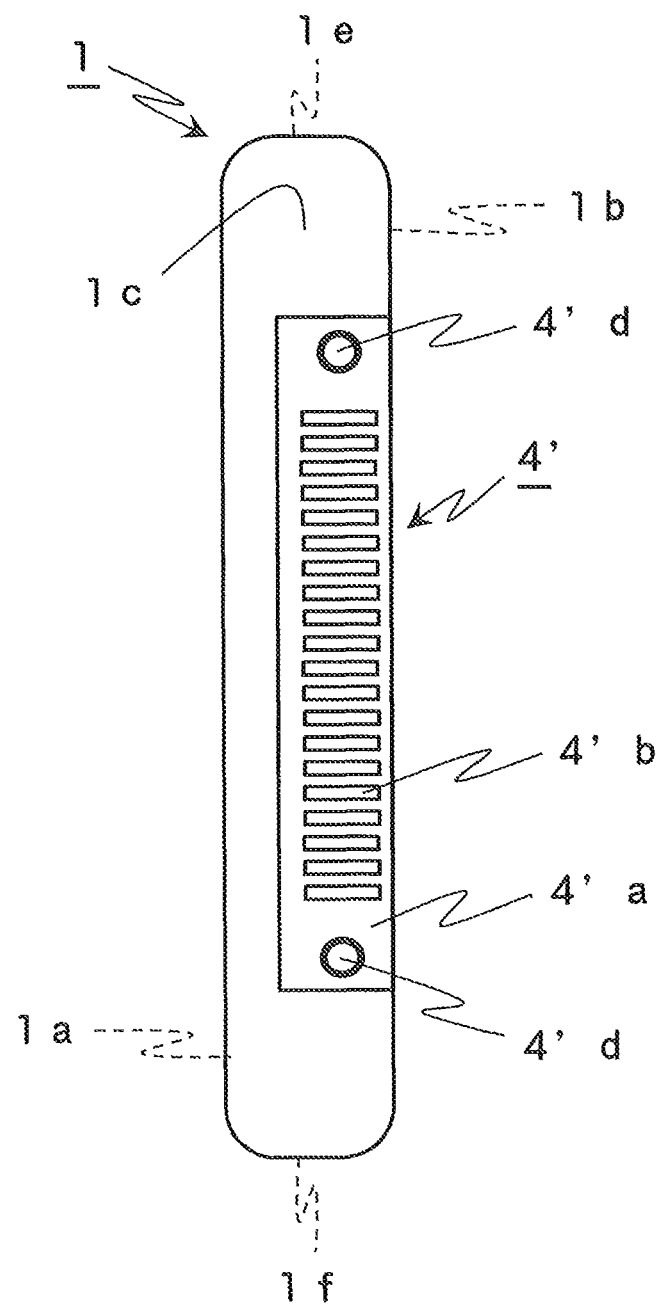
FIG. 8A is a perspective view of another connection terminal on the PC.

FIG. 8A and FIG. 8B show the external configuration of the PC 1 of the present modification. It should be noted that since the external configuration of the PC 1 itself is similar to that in Embodiment 1 or Embodiment 2, description thereof is omitted. In the present modification, the PC 1 includes a rear surface electrode 3' and a lower electrode 4'. Since the configurations of an insulator 3'a and electrodes 3' of the rear surface electrode 3' are similar to those of the rear surface electrode 3 in Embodiment 1 shown in FIG. 1B, description of those is omitted. In addition, since the configurations of an insulator 4'a, electrodes 4'b, and one pair of retainers 4'c of the lower electrode 4' are similar to those of the lower electrode 4 in Embodiment 1 shown in FIG. 1C, description of those is omitted. As can be seen from the state in FIG. 8A, diagrammatic representation of the electrodes 3'b of the rear surface electrode 3' is omitted since the electrodes 3'b will overlap with a boundary line between the rear surface 1b and the lower surface 1c to make the representation confusing. In the present modification, one pair of positioning concave parts 4'd is disposed in directions in which the electrodes 4'b protrude from the insulator 4'a on the corresponding pair of the retainers 4'c of the lower electrode 4' as shown in FIG. 8B.

[Configuration of Expansion Unit]

Figure 9A:
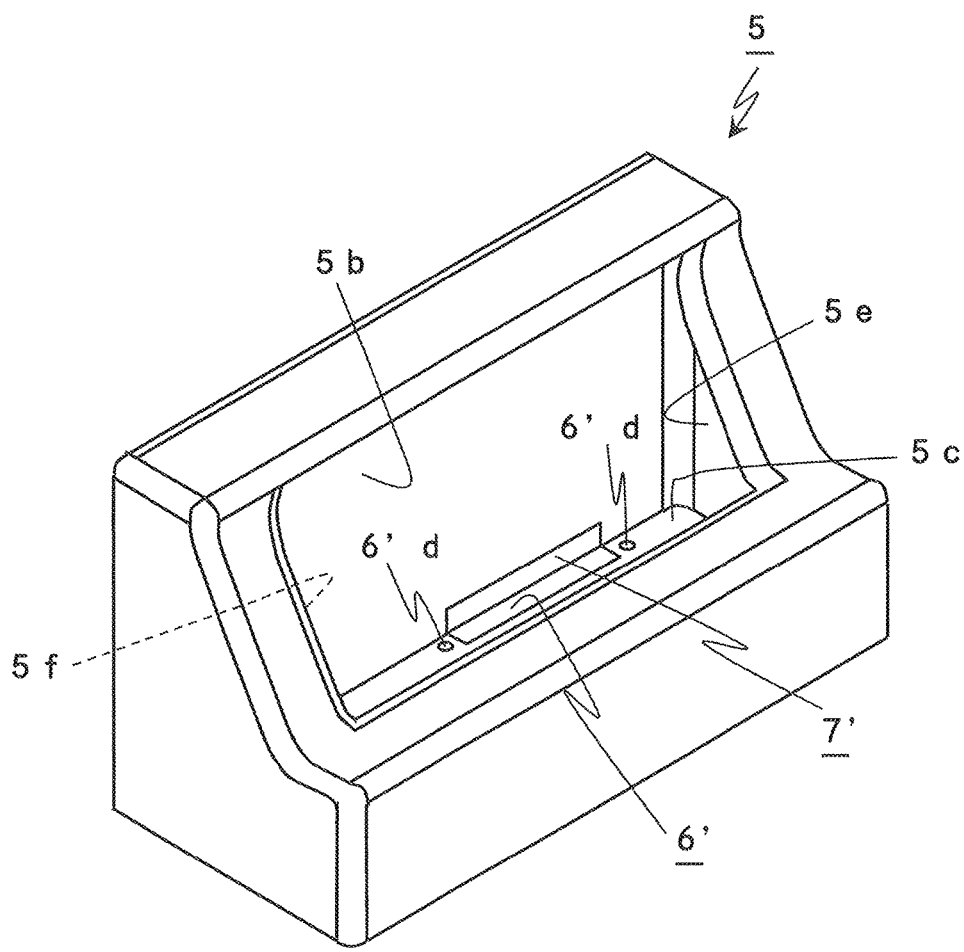
FIG. 9A is a perspective view of another configuration of the expansion unit.
Figure 9B:
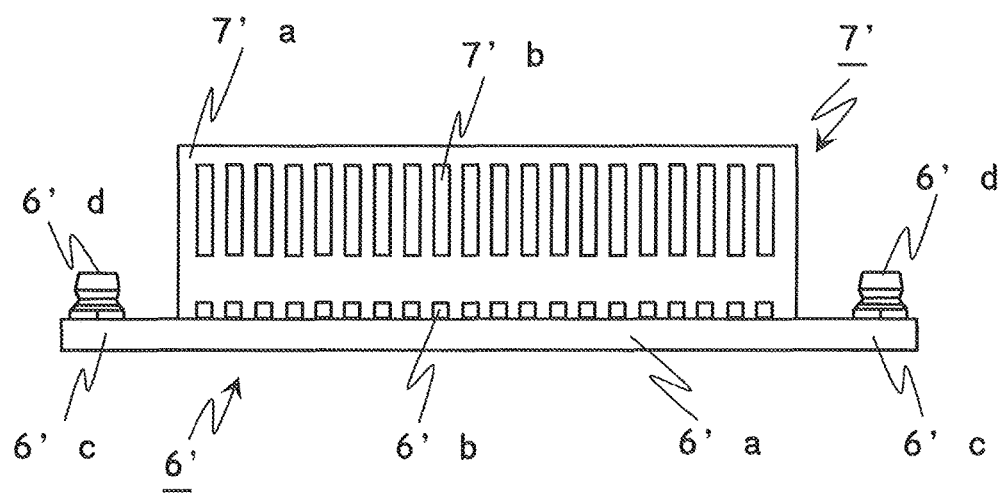
FIG. 9B is a front view of the main portions of the connection-target terminal.
Figure 9C:
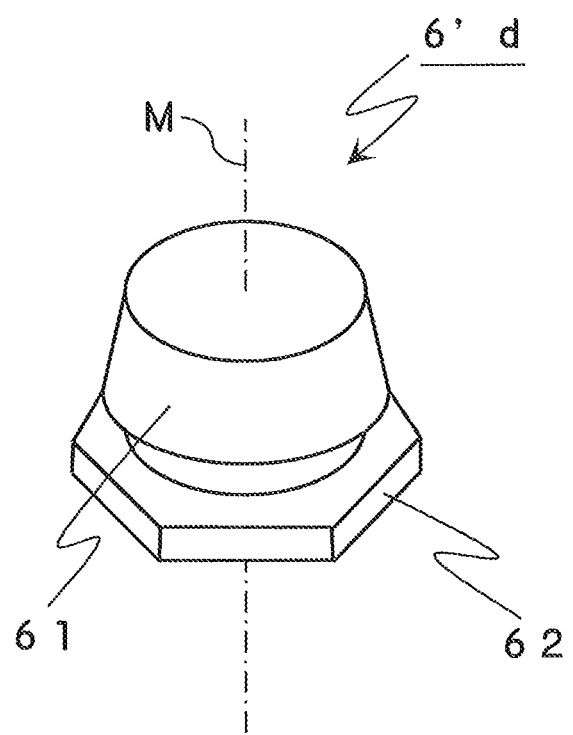
FIG. 9C is a perspective view of a positioning convex part of the expansion unit.

FIG. 9A shows the configuration of the expansion unit 5 on which the PC 1 described above can be mounted. As described above, since the PC 1 has the pair of the positioning concave parts 4'd, one pair of positioning convex parts 6'd is included on the corresponding pair of retainers 6'c. As shown in FIG. 9D, the positioning convex parts 6'd each include a convex main body part 61, and a convex-part fastening part 62 for fastening the convex main body part 61 to each of the retainers 6'c. It should be noted that since the configuration of the expansion unit 5 itself is similar to that of, for example, Embodiment 1, description thereof is omitted. In addition, since the configuration of an insulator 6'a, electrodes 6'b, the pair of the retainers 6'c of the bottom surface electrode 6', and the configuration of an insulator 7'a and electrodes 7'b of the back surface electrode 7' are similar to those in Embodiment 1 described with reference to FIG. 2A; descriptions of those are omitted. Furthermore, in the present embodiment, although the bottom surface electrode 6' and the rear surface electrode 7' are integrally formed at an edge part between the insulators 6'a and 7'a as shown in FIG. 9B; this is merely one example, and the electrodes may be formed, for example, separately as described with FIG. 2A.

[Advantageous Effects, Etc.]

In the present embodiment, the pair of the positioning concave parts 4'd is disposed on the lower surface 1c of the PC 1, and the pair of the positioning convex parts 6'd is disposed on the bottom surface 5c of the expansion unit 5.

With this configuration, the accuracy of positioning the PC 1 with respect to the expansion unit 5 can be improved, and the lower electrode 4' and the bottom surface electrode 6' can be connected with certainty. As a result, the rear surface electrode 3' and the back surface electrode 7' can also be connected with certainty. More specifically, since the outer diameter of each of the positioning convex parts 6' is smaller than an inner circumference 41 of the top part of each of the positioning concave parts 4'd, mounting can be conducted with certainty by roughly adjusting a relative position between the lower surface 1c of the PC 1 and the bottom surface 5c of the expansion unit 5, and then tilting the PC 1 with respect to the expansion unit 5.

The configuration of the lower electrode 4' and the bottom surface electrode 6', and the configuration of the rear surface electrode 3' and the back surface electrode 7' are not limited to those of the present embodiment; and, for example, a configuration can be applied in which the positioning concave parts 4'd included in the lower electrode 4' are each also formed in a cylindrical shape.

Furthermore, the above described configuration may be applied to, for example, a configuration in which the bottom surface 8c is tilted with respect to the main body 8m described in Embodiment 2, or a configuration including the elastic electrodes (10b, 11b, 13b, and 14b) described in Modification 1.

As in the present embodiment, with the configuration of including the positioning convex parts 6' and/or positioning convex parts 7' on the expansion unit 5; the right lateral surface 5e, the right side shell 5i, the left lateral surface 5f, and the left side shell 5j of the expansion unit 5 can be omitted. With the PC 1 that engages the bottom surface electrode 6' and the pair of the positioning convex parts 6'd included on both ends of the bottom surface electrode 6', and/or the rear surface electrode 7' and one pair of positioning convex parts 7'd included on both ends of the rear surface electrode 7'; mounting can be conducted regardless of the distance between the right surface 1e and the left surface 1f. In addition, with this configuration, reduction of weight and cost of the expansion unit 5 becomes possible. This applies not only to the expansion unit 5 but also to the expansion unit 8.

The embodiments have been described above as illustrative examples of the technology disclosed in the present application. However, the technology in the present disclosure is not limited thereto and is also applicable to embodiments in which changes, substitutions, additions, omissions, and the like are made as appropriate.

The embodiments have been described above as illustrative examples of the technology in the present disclosure. For that, the accompanying drawings and the detailed description have been provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof

INDUSTRIAL APPLICABILITY

The present disclosure relates to a configuration in which, in addition to one connection electrode, an electrode is also disposed on a surface adjacent to the surface where the one electrode is disposed. This configuration is not limited to a tablet type computer as described above, and can also be applied to electronic apparatuses such as, for example, a laptop computer, a mobile phone, a game machine, a medical care related device, an inventory-management device, and a customer-management device, etc.

DESCRIPTION OF THE REFERENCE CHARACTERS

1 PC
1a front surface
1b rear surface
1c lower surface
1d upper surface
1e right surface
1f left surface
2 display panel
3 rear surface electrode
3a insulator
3b electrode
3' rear surface electrode
3'a insulator
3'b electrode
3'd positioning concave part
31 concave part inner circumference
33 top part
4 lower electrode
4a insulator
4b electrode
4c retainer
4' lower electrode
4'a insulator
4'b electrode
4'c retainer
4'd positioning concave part
41 concave part inner circumference
42 top part inner circumference
43 top part
5 expansion unit
5a front surface
5b back surface
5c bottom surface
5e right lateral surface
5f left lateral surface
5g front shell
5h back shell
5i right shell
5j left shell
5k upper shell
6 bottom surface electrode
6a insulator
6b electrode
6c retainer
6' bottom surface electrode
6'a insulator
6'b electrode
6'c retainer
6'd positioning convex part
7 back surface electrode
7a insulator
7b electrode 7c retainer
7' back surface electrode
7'a insulator
7'b electrode
7'd positioning convex part
8 expansion unit
8a front surface
8b back surface
8c bottom surface
8e right lateral surface
8f left lateral surface
8g front shell
8h back shell
8i right shell
8j left shell
8k upper shell
8l lower shell
8m main body
9 rotation shaft
10 bottom surface electrode
10a insulator
10b elastic electrode
10c penetration hole
11 back surface electrode
11a insulator
11b elastic electrode
11c penetration hole
12 expansion unit electrode
12a edge part
13 rear surface electrode
13a insulator
13b elastic electrode
13c penetration hole
14 lower electrode
14a insulator
14b elastic electrode
14c penetration hole
15 PC electrode
15a edge part

The invention claimed is:

1. An electronic apparatus comprising:
a bottom surface on which a first connection terminal is disposed; and
a rear surface on which a second connection terminal is disposed, wherein
the first connection terminal and the second connection terminal are formed on a common substrate,
an edge formed by the bottom surface and the rear surface is formed by the substrate,
an expansion unit, having a first connection-target terminal to which the first connection terminal is to be connected and a second connection-target terminal to which the second connection terminal is to be connected, is to be connected to the electronic apparatus, the first connection-target terminal and the second connection-target terminal have a spring characteristic, and
when a connection is formed with the expansion unit, the electronic apparatus is subjected to a repulsive force generated by the first connection-target terminal from a side of the bottom surface toward a side of the rear surface, and a repulsive force generated by the second connection-target terminal from the side of the rear surface toward the side of the bottom surface.

2. The electronic apparatus according to claim 1, wherein a data-communication function is integrally managed through one of the first connection terminal and the second connection terminal, and a charging function is integrally managed through a connection terminal other than the one of the first connection terminal and the second connection terminal.

3. The electronic apparatus according to claim 1, wherein the first connection terminal and the second connection terminal connect to the first connection-target terminal and the second connection-target terminal, respectively, without shifting a shape of the first connection terminal and the second connection terminal.

4. An electronic apparatus comprising:
a housing having a first face and a second face;
a first connection terminal disposed on the first face; and
a second connection terminal disposed on the second face,
wherein the first face, on which the first connection terminal is disposed, and the second face, on which the second connection terminal is disposed, are not the same face,
an expansion unit, having a first connection-target terminal to which the first connection terminal is to be electrically connected and a second connection-target terminal to which the second connection terminal is to be electrically connected, is to be connected to the electronic apparatus, the first face is a bottom face of the housing, the second face is a rear face of the housing, and the first connection terminal and the second connection terminal are each disposed parallel to an intersection line formed between the bottom face and the rear face.

5. The electronic apparatus according to claim 4, wherein the first connection-target terminal and the second connection-target terminal have a spring characteristic, and when a connection is formed with the expansion unit, the electronic apparatus is subjected to a repulsive force generated by the first connection-target terminal from a side of the first face toward a side of the second face, and a repulsive force generated by the second connection-target terminal from the side of the second face toward the side of the first face.

* * * * *